(12) United States Patent
Boyen

(10) Patent No.: US 8,254,571 B1
(45) Date of Patent: Aug. 28, 2012

(54) CRYPTOGRAPHIC SYSTEM WITH HALTING KEY DERIVATION FUNCTION CAPABILITIES

(75) Inventor: Xavier Boyen, Mountain View, CA (US)

(73) Assignee: Voltage Security, Inc., Cupertino, CA (US)

( * ) Notice: Subject to any disclaimer, the term of this patent is extended or adjusted under 35 U.S.C. 154(b) by 1249 days.

(21) Appl. No.: 11/963,726

(22) Filed: Dec. 21, 2007

(51) Int. Cl.
*H04L 9/00* (2006.01)

(52) U.S. Cl. ............... 380/44; 380/28; 380/30; 380/46; 380/263; 380/281; 380/277; 380/252; 380/47; 713/164; 713/168; 713/184; 713/176; 713/193; 713/194; 713/155; 713/171; 713/170; 713/178; 711/216; 726/6; 726/27

(58) Field of Classification Search ............... 380/44
See application file for complete search history.

(56) References Cited

U.S. PATENT DOCUMENTS

| | | | | |
|---|---|---|---|---|
| 5,430,836 | A * | 7/1995 | Wolf et al. | 715/744 |
| 6,079,021 | A * | 6/2000 | Abadi et al. | 726/14 |
| 2002/0073309 | A1* | 6/2002 | Kurn et al. | 713/155 |
| 2002/0078354 | A1* | 6/2002 | Sandhu et al. | 713/171 |
| 2003/0105964 | A1* | 6/2003 | Brainard et al. | 713/178 |
| 2003/0131266 | A1* | 7/2003 | Best et al. | 713/202 |
| 2006/0041759 | A1* | 2/2006 | Kaliski et al. | 713/184 |

OTHER PUBLICATIONS

K. Yee et al "Passpet: Convenient Password Management and Phishing Protection", Symposium on Usable Privacy and Security (SOUPS) Jul. 2006.

J. Viega et al. "Patent-free, parallelizable MACing", [online], [retrieved on Dec. 21, 2007]: <URL: http://www1.ietf.org/mail-archive/web/cfrg/current/msg00126.html>.

B. Kaliski "PKCS #5: Password-Based Cryptography Specification, Version 2.0", Network Working Group Request for Comments: 2898, [online], [retrieved on Dec. 21, 2007], <URL: http://www.ietf.org/rfc/rfc2898.txt>.

N. Provos et al. "A Future-Adaptable Password Scheme", Proceeding of the FREENIX Track: 1999 USENIX Annual Technical Conference, Monterey, California, Jun. 1999, [online], [retrieved on Dec. 21, 2007], <URL: http://www.usenix.org/events/usenix99/provos/provos.pdf>.

C. Dwork et al. "On Memory-Bound Functions for Fighting Spam", [online], [retrieved on Dec. 21, 2007], <URL: http://research.microsoft.com/research/sv/sv-pubs/crypto03.pdf>.

C. Dwork et al. "Pricing via Processing or Combatting Junk Mail", pp. 139-147, Springer-Verlag 1998, [online], [retrieved on Dec. 21, 2007], <URL: http://dsns.csie.nctu.edu.tw/research/crypto/HTML/PDF/C92/139.PDF>.

* cited by examiner

*Primary Examiner* — Nathan Flynn
*Assistant Examiner* — Bryan Wright
(74) *Attorney, Agent, or Firm* — Treyz Law Group; David C. Kellogg; G. Victor Treyz

(57) ABSTRACT

A halting key derivation function is provided. A setup process scrambles a user-supplied password and a random string in a loop. When the loop is halted by user input, the setup process may generate verification information and a cryptographic key. The key may be used to encrypt data. During a subsequent password verification and key recovery process, the verification information is retrieved, a user-supplied trial password obtained, and both are used together to recover the key using a loop computation. During the loop, the verification process repeatedly tests the results produced by the looping scrambling function against the verification information. In case of match, the trial password is correct and a cryptographic key matching the key produced by the setup process may be generated and used for data decryption. As long as there is no match, the loop may continue indefinitely until interrupted exogenously, such as by user input.

29 Claims, 12 Drawing Sheets

CRYPTOGRAPHIC SYSTEM WITH HALTING KEY DERIVATION FUNCTION CAPABILITIES

BACKGROUND OF THE INVENTION

This invention relates to cryptography, and more particularly, to cryptographic systems with halting key derivation function capabilities.

Cryptographic systems are used to secure data in a variety of contexts. For example, encryption algorithms are used to encrypt sensitive information such as financial account numbers, social security numbers, and other personal information. By encrypting sensitive data prior to transmission over a communications network, sensitive data may be secured, even if it passes over an unsecured communications channel. Sensitive data is also sometimes encrypted prior to storage in a database. This helps to prevent unauthorized access to sensitive data by an intruder.

Cryptographic systems may use cryptographic keys to encrypt and decrypt data. In a symmetric key system, the same key is used during decryption that was used during encryption. These keys can be generated from user-supplied passwords using a key derivation function. The strength of a password-based cryptographic system is related to how long it might take an attacker to correctly guess a password. System strength is affected by the type of password that is chosen and by the type of key derivation function that is used to derive the key from the password.

A password-based cryptographic system may be strengthened by increasing the complexity of its password. For example, a user may avoid using common words or names as passwords. The more complex a password is, the longer it will generally take an attacker to correctly guess the password. However, strengthening a system in this way requires that a user be able to remember a complex password. This can be burdensome for the user. Increasing the difficulty in deriving a cryptographic key will force a potential attacker to spend more time calculating a cryptographic key for each guessed password.

A conventional key derivation function creates a reproducible cryptographic key from a password and random data called a salt that is made public. Use of the salt as an input to the key derivation function precludes a potential attacker from using a recalculated dictionary-based lookup table as a shortcut. Key derivation functions may scramble a password and salt by applying a hash function to the password and salt a fixed number of times. The result of this operation may serve as the cryptographic key. The use of multiple iterations of the hash function serves to slow down cryptographic attackers that are attempting to guess a correct password from a "dictionary" of possible or likely passwords. The number of iterations used for the hash function in this type of conventional key derivation function is a publicly known constant value. Because the number of iterations is publicly known, attackers who are attempting to guess a password only need to run a key derivation function to its publicly known maximum iteration count.

The availability of multi-core processors has increased the processing power available to attackers relative to users. Because conventional key derivation functions rely on the iterated application of a cryptographic hash function for a fixed number of iterations, conventional key derivation functions generate keys using a sequential computational process. As a result, conventional key derivation functions have generally only been implemented using single core platforms. On the other hand, attackers can, in principle, run multiple trial passwords through conventional key derivation functions simultaneously using many independent computers, each of which possibly equipped with multiple computing cores.

It would therefore be desirable to provide a key derivation function with enhanced security features.

SUMMARY OF THE INVENTION

A halting key derivation function is provided that may be used for generating cryptographic keys. The cryptographic keys may be used during data encryption and data decryption operations.

In a halting key derivation setup process, a user provides a password. In a loop, the user-supplied password and a random string may be iteratively scrambled using a scrambling function such as a hash function. Each iteration of the scrambling function modifies the state of the key derivation function.

When the user is ready to exit the loop, the user supplies user input. In a typical scenario, the user clicks on an on-screen option on a computer display. In response to this manual user input, the halting key derivation process halts the iterative looping process.

After exiting the loop in response to the user input, the halting key derivation function setup process generates a cryptographic key based on the final state of the halting key derivation function. The halting key derivation function setup process also generates verification information based on the final state of the halting key derivation function. The verification information may be publicly stored for subsequent use by a halting key derivation function password verification and recovery process. The cryptographic key may be used for encrypting data.

When a user desires to decrypt the encrypted data, the user may supply a halting key derivation function password verification and key recovery process with a trial password. The halting key derivation function password verification and key recovery process may retrieve the verification information that was stored by the halting key derivation function setup process. The random string that was generated during setup may be recovered from the verification information. Information on the final state of the halting key derivation function from the setup process may also be extracted from the verification information.

The halting key derivation function password verification and key recovery process may process the trial password and the recovered random string in a loop. In the loop, a hash function or other scrambling function may be applied to iteratively update the state of the halting key derivation function. During the loop, the current state of the halting key derivation function may be compared to the recovered information on the final state of the halting key derivation function setup process. If this information does not match, the loop may continue until aborted by a user. If a match is detected, however, the process may exit the loop and generate a corresponding cryptographic key for use in decrypting the encrypted data.

The halting key derivation function setup and password verification and key recovery processes and other key derivation functions may be implemented on processors with multiple cores. In this type of configuration, multiple instances of a key derivation function such as a halting key derivation function may be instantiated. Each instance of the key derivation function may be run on a separate core and may have a corresponding state. In a loop, a merged state that is based on the states of the multiple instances of the key derivation function may be created. This state may be used in key generation and password verification operations.

DETAILED DESCRIPTION

Figure 1:
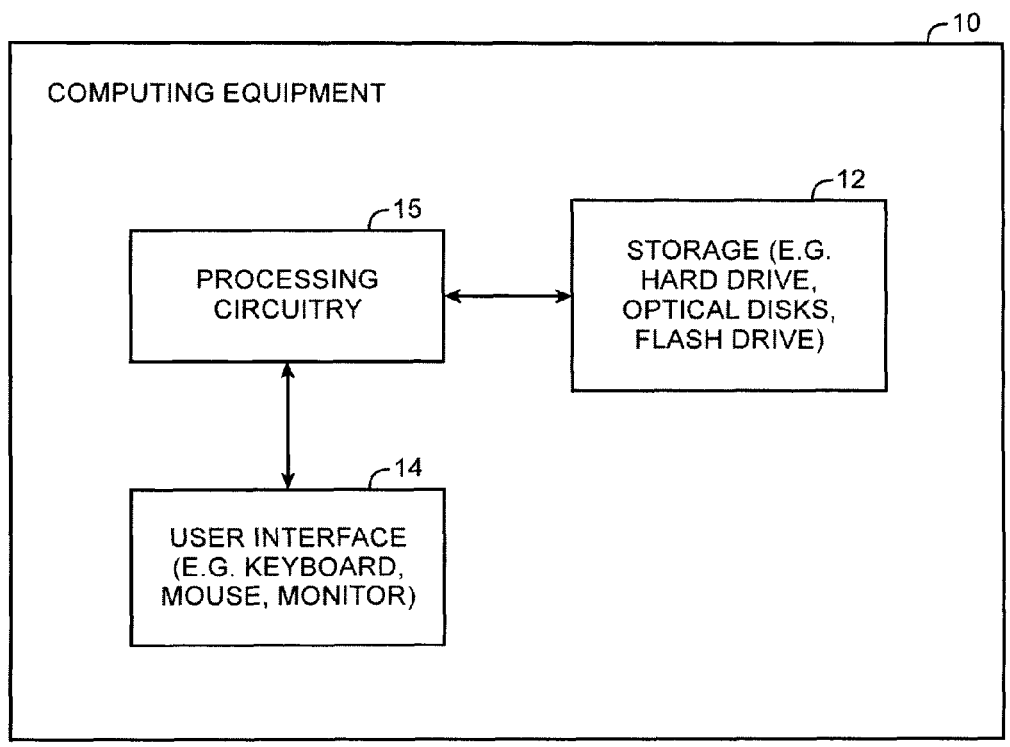
FIG. 1 is a diagram of an illustrative system environment in which a key derivation function may be used in accordance with an embodiment of the present invention.

Cryptographic systems may be used to secure data from unauthorized users. In a typical arrangement, a cryptographic system may verify whether a user is authorized before granting access to sensitive data. Examples of methods a cryptographic system may use to verify a user's identity include password-based verification, biometric identification, and identification techniques based on physical tokens. In the following illustrative embodiments, text-based password verification is described as a suitable method of verification. However any other suitable verification method may be used in place of password-based verification. For example, a voice print or fingerprint password identification scheme may be used by representing biometric information as a text string.

Once a user has been authorized using a password, a cryptographic system may perform suitable functions in a secure manner. In the following illustrative embodiments, a key derivation function is used to generate a cryptographic key from the user's password for use in data encryption and decryption. The key that has been generated may be used to encrypt data in any suitable environment. With one arrangement, which is sometimes described herein as an example, the cryptographic system may be used to encrypt sensitive data on the hard drive of a personal computer.

Encryption systems may use an encryption algorithm and a decryption algorithm. Encryption algorithms may use an encryption key. Decryption algorithms may use a decryption key. In a symmetric key cryptographic system, the cryptographic keys used for the encryption algorithm and the decryption algorithm are the same. In this type of system, the term key or cryptographic key may be used interchangeably with the terms encryption key and decryption key.

Cryptographic systems may be used to secure data in an encrypted form. The data may be of a sensitive nature that would cause harm if publicly available. For example, the data may be information in a governmental database or other private information. Encrypted data is secure because it is indecipherable without a correct decryption key.

A cryptographic system may use computing equipment that includes storage, a user interface, and processing circuitry. The computing equipment may be connected to a communications network such as the internet. With one suitable arrangement, which is sometimes described herein as an example, the cryptographic system may be used to encrypt sensitive data on the hard drive of a personal computer.

Password-based cryptographic systems may use key derivation functions to generate cryptographic keys from user-supplied passwords. A key that is generated using a key derivation function may be used for data encryption or data decryption. A key derivation function may generate a key by scrambling a password and a random string (called salt) using a hash function. A well designed hash function for a key derivation function is reproducible and may be irreversible. Given the same password and salt, a reproducible hash function will produce the same hash output. For example, user A and user B may run a hash function with the same password P and salt S. If the hash function is reproducible, both user A and user B will generate the same hash output O. An irreversible hash function produces a hash output that cannot not be reverse engineered to recover its original input within reasonable computational limits. Key derivation functions in accordance with the present invention may use any suitable hash function. For example a SHA-1 hash function may be used in a key derivation function.

A salt may be used as an input to a key derivation function to prevent attacks based on lookup tables. The salt may be provided in the form of a random string. Without a salt, a lookup table of hash function outputs could be pre-calculated using a dictionary of trial passwords.

The hash function in a key derivation function may be applied in an iterative fashion. For example, in a first iteration, a hash function may receive a password and a salt as inputs. In each subsequent iteration, the output of the previous iteration may be used as the input for the hash function. The output of the hash function following the last iteration may be used as the key derivation function output.

In conventional key derivation functions that apply hash functions iteratively, the number of iterations is fixed and publicly known. A halting key derivation function in accordance with the present invention may take a password and a random string or other salt as inputs and may produce a corresponding key as an output. Unlike conventional key derivation functions that use a fixed number of hash function iterations, there is generally no preset limit to the number of hash function iterations in the halting key derivation function.

The number of iterations may be selected by the user to satisfy the desired compromise between security and speed of decryption. This number is not publicized, and is preferably kept secret by the user who selected it. Nevertheless, in accordance with the present invention, the user is permitted to forget such number and remember only the password for future use (e.g., to allow subsequent decryption operations).

During an initial key setup process, the halting key derivation function may iteratively apply a suitable scrambling function such as a cryptographic hash function until a user elects to halt the process. For example, the halting key derivation function may present a user with an opportunity to halt a loop of hash function iterations after a user-selected time period or after a user-selected iteration count.

When verifying a trial password to determine whether it is authentic, the halting key derivation function may automatically stop when the trial password is successfully verified. In the event that the trial password is not valid, the halting key derivation function may iteratively apply the hash function until the halting key derivation function is either manually aborted by the user or exceeds the capabilities of the computing equipment being used.

The halting key derivation function imposes a computational penalty on an attacker that is trying to determine the cryptographic key by guessing the password. The size of the computational penalty scales with the number of hash function iterations that were used during the initial key setup process. If a user lets the halting key derivation function loop for a long time during setup, it will be harder for an attacker to break the system.

An attacker who is attempting to crack the halting key derivation function with a dictionary will generally need to make multiple passes through the dictionary, each with a growing trial number of hash function iterations. This is because the appropriate number of iterations is not known to the attacker. Each pass will require the attacker to recomputed the halting key derivation function on the dictionary words from the start, because it is not feasible for the attacker to save intermediate results that are produced during an attack. At best, the attacker can work through the entire dictionary using a trial iteration count. If the attacker fails to break the halting key derivation function, the attacker can try again with an increased iteration count. Even if the attacker uses an optimally chosen pattern of trial iteration counts, an attacker on the halting key derivation function is expected to take approximately 4 times more computational effort than a comparable dictionary attack on a conventional key derivation function (i.e., with a fixed or public iteration count, if the iteration counts used were similar).

The halting key derivation function may have a running hash value that is produced during key derivation operations. The running hash value may be initialized from the inputs to the halting key derivation function. The initialized running hash value may be modified by iteratively applying a hash function.

The halting key derivation function may have a state that is modified with each iteration of the hash function (or other suitable scrambling function). The state of the function may be represented by an array of intermediate hash function values. By balancing the rate at which the number of array elements grows (which consumes memory resources) with the computational expense associated with producing each element (which relates to computational resources), a designer of the halting key derivation function can make adjustments to the halting key derivation function to ensure that a user will have sufficient memory resources available to run the halting key derivation function while imposing sufficient computational and memory expenses on attackers.

An illustrative embodiment of a hardware platform on which a cryptographic system in accordance with the present invention may be implemented is shown in FIG. 1. As shown in FIG. 1, a cryptographic system in accordance with the invention may use computing equipment 10. Computing equipment 10 may include one or more personal computers, portable computers, servers, cellular telephones, handheld devices, smart cards, or other suitable equipment.

Computing equipment 10 may include processing circuitry 15. Processing circuitry 15 may be implemented using a custom designed processing chip, a single-core processor, a multi-core processor, a digital signal processor, a microcontroller, an application specific integrated circuit, combinations of such processors, or any other suitable processing circuitry. Processing circuitry 15 may be used to support the functions of a cryptographic system. For example, key derivation functions, halting key derivation function setup processes, halting key derivation function password verification and key recovery processes, encryption algorithms, and decryption algorithms may be supported using processing circuitry 15.

Computing equipment 10 may include storage 12. Storage 12 may include one or more hard drives, optical disks, flash drives, volatile memory devices, non-volatile memory devices, magnetic tape drives, or other suitable storage devices. Storage 12 may be used to store encrypted data and unencrypted data. Storage 12 may also be used to store software for implementing key derivation functions, user interface functions, encryption and decryption functions, etc.

Computing equipment 10 may include a user interface 14. User interface 14 may include one or more devices such as a keyboard, mouse, monitor, touch-screen display, voice command interface (e.g. a speaker and a microphone), fingerprint reader, camera, or any other suitable user interface device.

Figure 2:
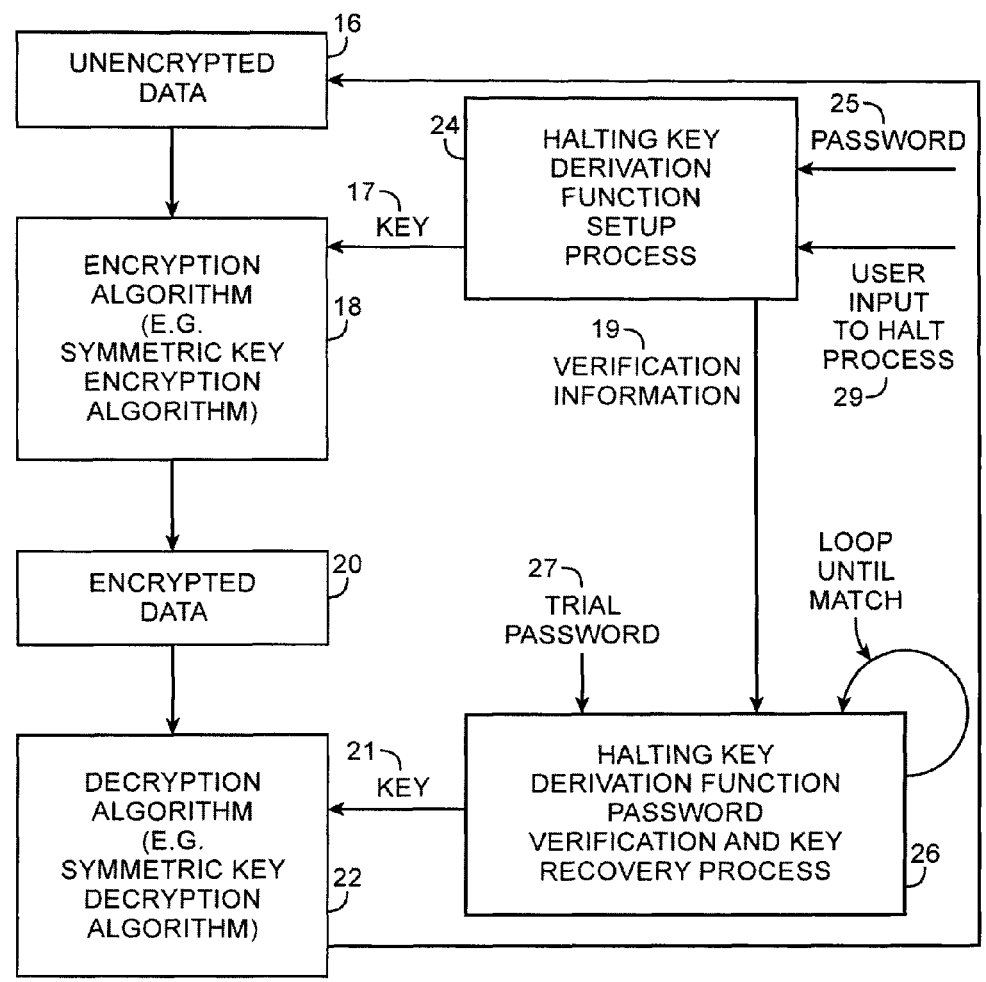
FIG. 2 is a data flow diagram showing how data may be moved between encrypted and unencrypted states in accordance with an embodiment of the present invention.

An illustrative data flow diagram showing operations involved in generating and using cryptographic keys in a cryptographic system is shown in FIG. 2. Computing equipment 10 of FIG. 1 may be used to run halting key derivation function setup process 24, halting key derivation function password verification and key recovery process 26, encryption algorithm 18, and decryption algorithm 22. Storage 12 of FIG. 1 may be used to store data such as encrypted data 16 and unencrypted data 20.

Before data is encrypted, a key may be generated using halting key setup process 24. Halting key setup process 24 may have as inputs a password 25 and a random string or other suitable salt. Use of a salt based on a random string is described herein as an example. Password 25 is typically selected by a user. A user may, for example, use user interface 14 to type in a desired password. Process 24 may generate the random string using a suitable random string generator. Process 24 may generate cryptographic key 17 and verification information 19 based on the user-supplied password and random string. The key generation process 24 may use an iterative scrambling process based on a hash function or other suitable scrambling function. Use of a hash function as the scrambling function is described herein as an example.

Iterative operations continue until specified by user input 29. User input 29 may be a real-time input (e.g., a mouse click) that directs process 24 to halt. Alternatively, user input 29 may be supplied in advance (i.e., before starting to generate the cryptographic key) in the form of a complexity parameter such as a time limit, a memory limit, a processor time limit (e.g., a limit to the number of processing cycles), a user-determined number of iterations of the iterative scrambling process, an arbitrary complexity selection such as complex or simple, an arbitrary complexity selection such as a scale of complexity from one to ten with one being simple and ten being complex, etc. With one suitable arrangement, a user may supply user input 29 before initiating the key generation process 24 by specifying a time limit (time delay) for process 24. Key 17 is preferably not produced until the scrambling function loop of process 24 is manually or automatically halted in this way.

Verification information 19 may contain the random string used during halting key setup process 24 and may contain additional state information such as hash function values produced when deriving cryptographic key 17. Verification information 19 may be stored (publicly) on storage 12 for later use by halting key derivation function password verification and key recovery process 26.

After producing cryptographic key 17 from the user-supplied password and the random string, key 17 may be used in data encryption operations. As shown in FIG. 2, unencrypted data 16 may be encrypted by encryption algorithm 18 to produce encrypted data 20. Algorithm 18 may be, for example, a symmetric key encryption algorithm. To maintain security, key 17 is generally not stored following data encryption.

When it is desired to decrypt data 20, a user can run process 26. Halting key derivation function password verification and key recovery process 26 may have as inputs a user-supplied trial password 27 and retrieved verification information 19. Process 26 may contain a scrambling function loop identical to the loop in process 24. This loop may run until the desired key is generated, the user aborts the process, or a limit defined by a complexity parameter (e.g., a user-supplied complexity parameter) is reached. For example, a complexity parameter may indicate that the loop in process 26 is to be halted if a user-specified time interval has passed without a successful match between the trial password and the verification information. If trial password 27 is incorrect, process 26 may continue in an indefinite loop unless a user aborts process 26. If trial password 27 is correct, process 26 will generate a cryptographic key 21 that matches key 17.

After key 21 has been generated, data 20 can be decrypted to produce unencrypted data 16 using decryption algorithm 22.

Figure 3A:
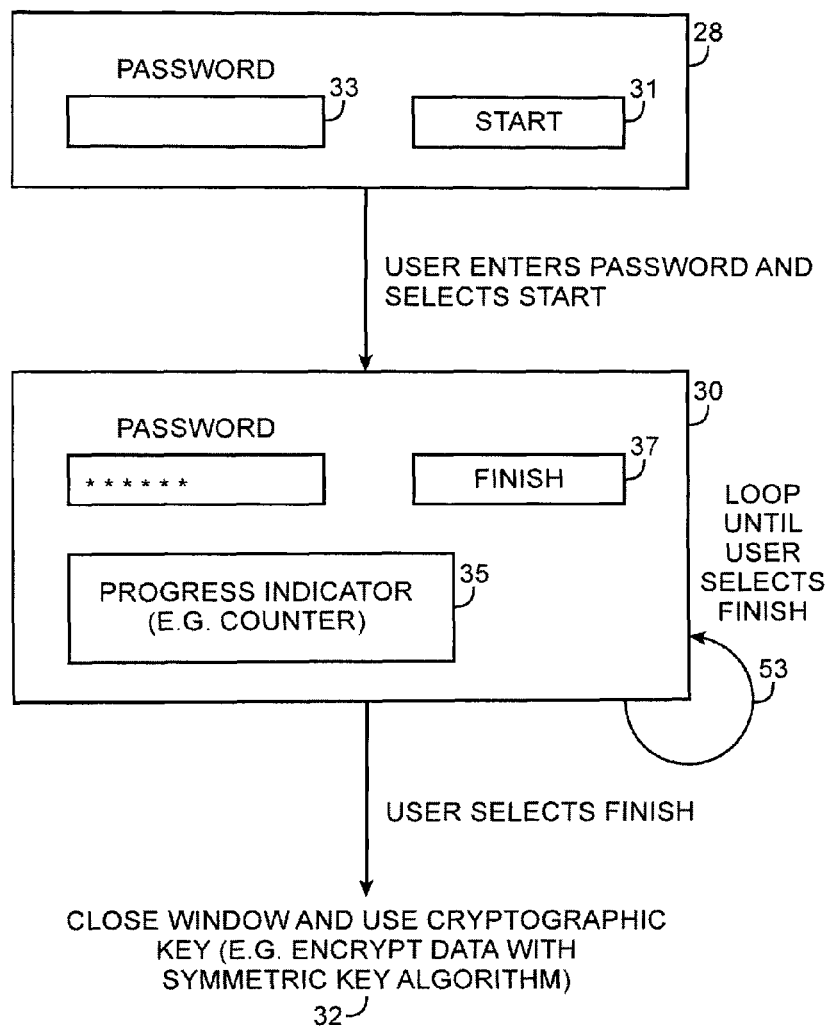
FIG. 3A shows illustrative display screens that may be presented to a user by a halting key derivation function setup process in accordance with an embodiment of the present invention.

Illustrative display screens that may be presented to a user during setup operations are shown in FIG. 3A. During setup operations, halting key derivation function setup process 24 may present a user with an on-screen opportunity to enter a password through a dialog box 28. The user may select start option 31 (e.g. by clicking on option 31) after entering a password in box 33.

After the user selects option 31, process 24 may present the user with on-screen options using dialog box 30. On-screen indicator 35 may contain visual information indicating that process 24 is running. Indicator 35 may be, for example, a counter indicating how many hash function iterations have been performed. Process 24 may present the user with an on-screen option (such as a clickable button) to change the format or content of progress indicator 35. Progress indicator 35 may be provided in the form of a counter, a rotating indicator wheel, or an animated icon displaying activity such as an overturning hourglass.

Process 24 may present the user with a selectable option 37 to finish the halting key setup process. If the user clicks on button 37 or otherwise indicated a desire to finish the halting key setup process, process 24 may exit loop 53, close screen 30, and generate key 17 and verification information 19, as indicated by step 32.

Figure 3B:
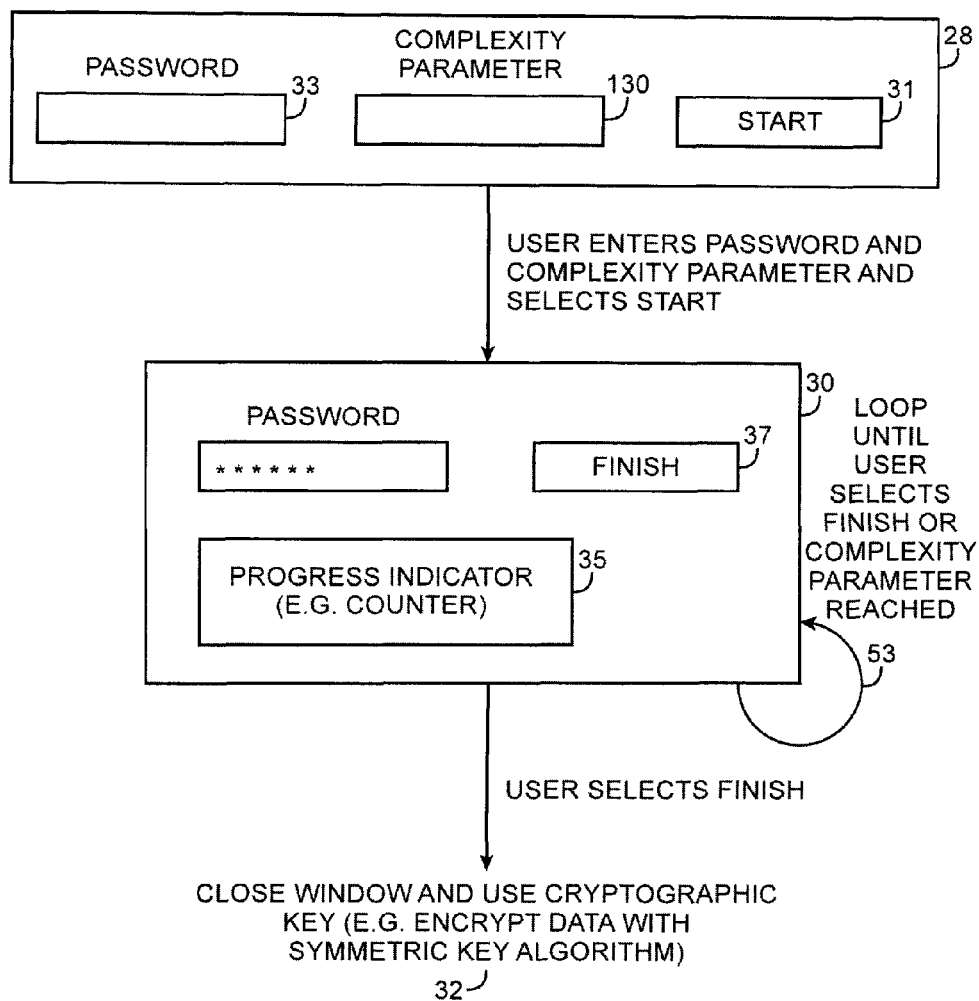
FIG. 3B shows illustrative display screens that may be presented to a user by a halting key derivation function setup process in accordance with an embodiment of the present invention.

FIG. 3B shows illustrative display screens that may be presented to a user during setup operations in which a user supplied a complexity parameter to specify when the key generation algorithm should halt. During setup operations, halting key derivation function setup process 24 may present a user with an on-screen opportunity to enter a complexity parameter through a computer user interface such as dialog box 130. The complexity parameter may define a stopping point for loop 53. For example, the complexity parameter may limit loop 53 based on a time limit, a memory limit, a processor time limit (e.g., a limit to the number of processing cycles), or a limit to the number of iterations of loop 53. Alternatively, the complexity parameter may indicate that loop 53 is to continue until a sufficiently complex cryptographic key is generated. For example, the complexity parameter may indicate that loop 53 is to continue until the cryptographic key has reached a user-determined complexity level. The complexity level of the cryptographic key may be defined by any suitable means. For example, a cryptographic key's complexity may be defined on an arbitrary scale such as complex or simple, an arbitrary scale from one to ten with one being simple and ten being complex, or a scale estimating how secure the cryptographic key is (e.g., by estimating how long it would take an attacker to determine the cryptographic key by guessing passwords).

Figure 4A:
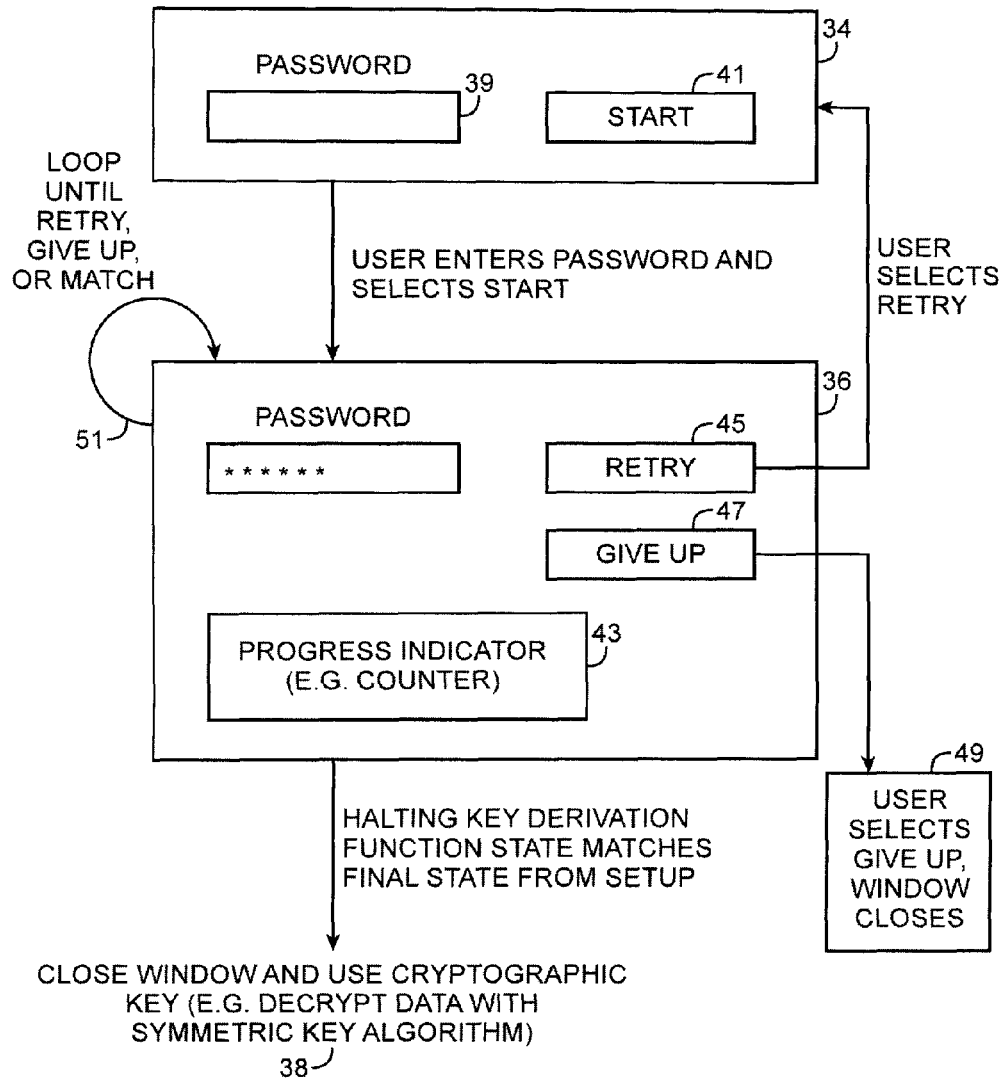
FIG. 4A shows illustrative display screens that may be presented to a user by a halting key derivation function password verification and key recovery process in accordance with an embodiment of the present invention.

Illustrative display screens that process 26 may display are shown in FIG. 4A. In dialog box 34, process 26 may present the user with an on-screen opportunity to enter a trial password in box 39. Process 26 may also present the user with on-screen start option 41 to start the key derivation operations of halting key password verification and recovery process 26.

The user may type a trial password into box 39 that matches (or is believed to match) the password used to generate key 17 (i.e., the password entered in box 33 of FIG. 3A). After selecting start option 41, process 26 may present the user with dialog box 36. Process 26 may present an on-screen display of activity 43 in the form of a counter, rotating indicator wheel, animated icon displaying activity such as an overturning hourglass, or other suitable format. Indicator 43 may be user configurable. If a count is displayed, indicator 43 may represent the number of iterations performed in hash function loop 51.

Process 26 may present a user with an on-screen option 45. If the password verification process is taking a long time, the user may surmise that the trial password was incorrect and may retry with a new trial password. If the user selects option 45, process 26 may present a user with another opportunity (a retry opportunity) to enter a trial password in box 34. If the user no longer wishes to attempt to verify trial passwords, the user can abort process 26 by clicking on give-up option 47. In response, process 26 may exit loop 51 and close box 36 (as shown by step 49).

If halting key derivation function recovery process 26 confirms that the trial password matches the correct password that was provided during setup, process 26 may close box 36 and generate key 21 as indicated by step 38. The key 21 may then be used to decrypt encrypted data 20.

Figure 4B:
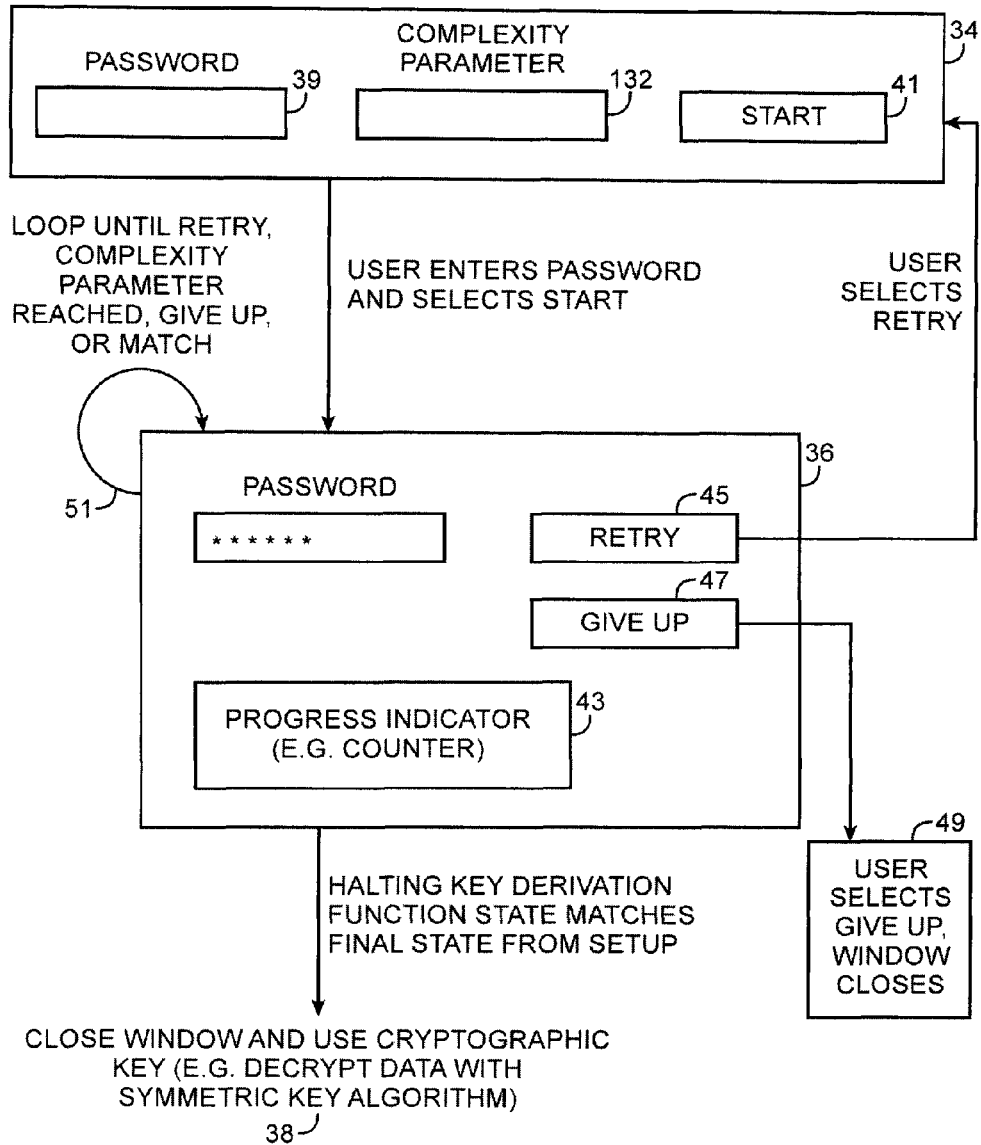
FIG. 4B shows illustrative display screens that may be presented to a user by a halting key derivation function password verification and key recovery process in accordance with an embodiment of the present invention.

Illustrative display screens that process 26 may display in scenarios in which a user specifies a stopping point for loop 51 are shown in FIG. 4B. In dialog box 34, process 26 may present the user with an on-screen opportunity to enter a complexity parameter in dialog box 34. For example, during password verification and key recovery operations, halting key derivation function password verification and key recovery process 26 may present a user with an on-screen opportunity to enter a complexity parameter through dialog box 132. The complexity parameter may define a limit for loop 51.

For example, the complexity parameter may limit loop 51 based on a time limit, a memory limit, a processor time limit (e.g., a limit to the number of processing cycles), or a limit to the number of iterations of loop 51. If desired, the complexity parameter may indicate that loop 51 is to continue until a state of process 26 has become sufficiently complex (e.g., reached a complexity level similar to the complexity level used by process 24 to generate the original key).

Figure 5:
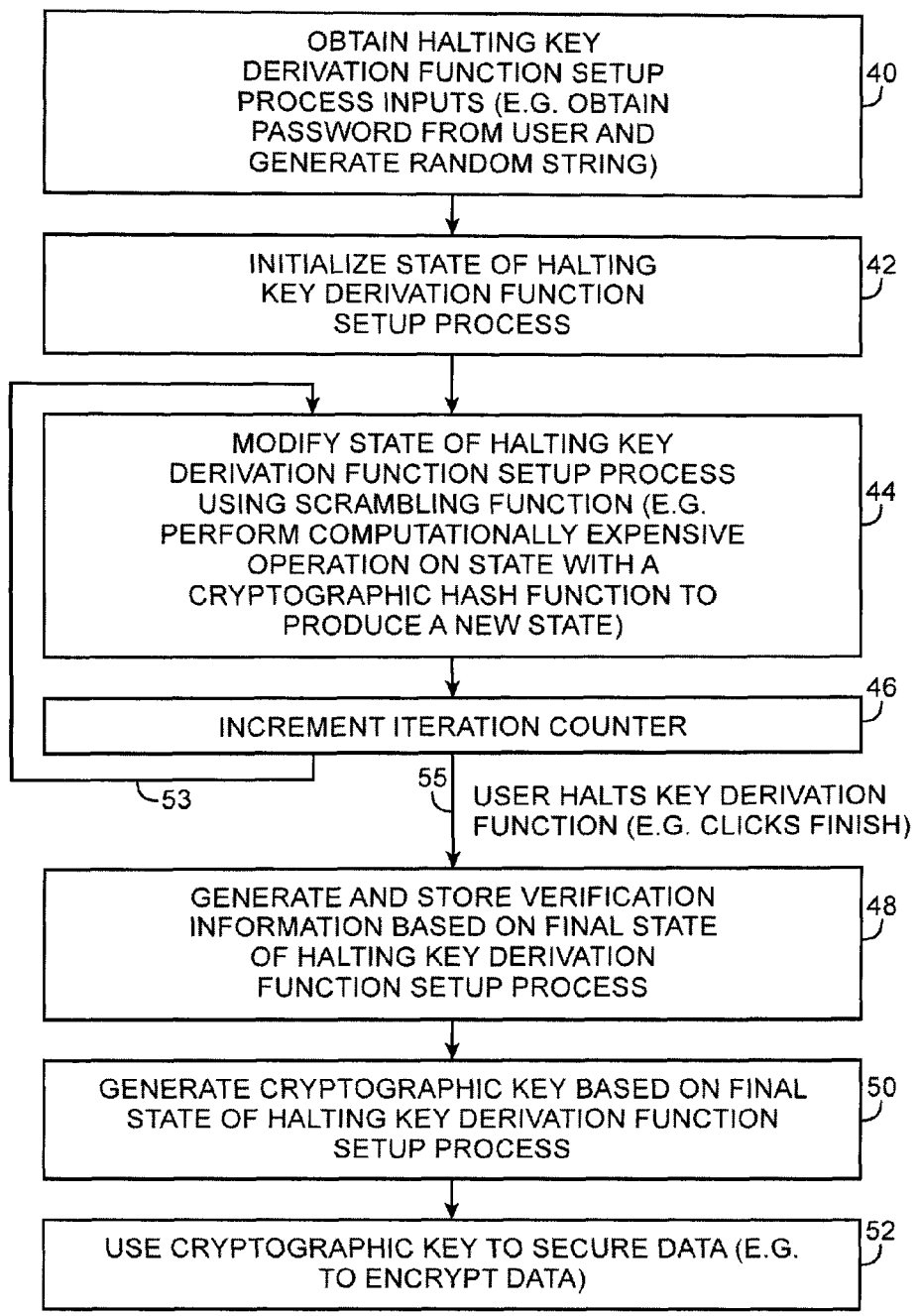
FIG. 5 is a flow chart of illustrative steps involved in using a halting key derivation function setup process in accordance with an embodiment of the present invention.

Illustrative steps involved in using a halting key derivation function setup process 24 are shown in FIG. 5. Halting key derivation function setup process 24 may obtain inputs at step 40. Process 24 may obtain input such as a password and a complexity parameter to specify when the key generation algorithm should halt from a user. Halting key derivation function setup process 24 may also generate or otherwise obtain a random string to use as a salt.

At step 42, the state of halting key derivation function setup process 24 may be initialized by initializing a running hash value. For example, halting key derivation function setup process 24 may initialize running hash value z as shown in equation 1.

$$z \leftarrow H(w,r) \quad (1)$$

In equation 1, w represents a user-supplied password, r represents a random string, H represents a hash function or other suitable scrambling function, and z represents the running hash value. Halting key derivation function setup process 24 may initialize the running hash value z in step 42 as part of or just before a first iteration of a potentially unbounded loop of hash function iterations (loop 53).

In each iteration of loop 53, at step 44, another element $y_i$ in an array of intermediate hash values is created, as shown in equation 2.

$$y_i \leftarrow z \quad (2)$$

In equation 2, i represents the iteration count of loop 53 and $y_i$ represents the i-th element of an array of intermediate hash values that is assigned a value equal to the current running hash value z. In each iteration of loop 53, the array of intermediate hash values increases in complexity (i.e., the array grows larger and the password generation computation and state of the halting key derivation function setup process have increasing complexity as another element $y_i$ is added). The hash function or other scrambling function used to modify the state of the halting key derivation function in step 44 need not be the same as the as the hash function or other scrambling function used to initiate the state of the halting key derivation function setup process in step 42.

During step 44, the state of halting key derivation function setup process 24 is modified using a scrambling function. The scrambling function is preferably reproducible and one way. As described herein as an example, the scrambling function may be based on a hash function H. Step 44 may involve computationally expensive operations. For example, halting key derivation function setup process 24 may perform a computationally expensive loop of q iterations of equations 3 and 4.

$$j \leftarrow 1+(z \bmod i) \quad (3)$$

$$z \leftarrow H(z,y_j) \quad (4)$$

In equation 3, an index value j is deterministically and uniformly selected based on the current loop count i (i.e. loop count i of loop 53) and the current value of the running hash value z. In equation 4, the current running hash value z is updated based on the previous value of z and intermediate hash value $y_j$ from the intermediate hash value array.

The operations of equations 3 and 4 may be repeated q times in each iteration of loop 53. The value of q may be selected to ensure that step 44 is computationally expensive. As an example, q may be $10^6$. The value of q is publicly known.

Halting key derivation function setup process 24 may increment the value of iteration count i at step 46.

The state of halting key derivation function setup process 24 may continue to be modified by looping back to step 44 as shown by loop 53 until the halting key derivation function setup process 24 is halted. Process 24 (i.e., loop 53) may be halted when a user clicks on finish option 37 (FIG. 3A) or when the stopping point for the loop that is defined by the complexity parameter is reached, as shown by line 55.

At step 48, halting key derivation function setup process 24 may generate and store verification information 19 to be used during subsequent password verification and key generation operations with process 26. For example, verification information v of equation 5 may be generated and stored in storage 12, as a concatenated pair comprising the hash value $H(y_1,z)$ and the string r.

$$v \leftarrow (H(y_1,z),r) \quad (5)$$

In equation 5, $y_1$ represents the first element of the array of intermediate hash value, z is the final running hash value on exiting loop 53, H is the hash function, and r is the random string from step 40.

At step 50, halting key derivation function setup process 24 may generate a cryptographic key 17 according to equation 6.

$$k \leftarrow H(z,r) \quad (6)$$

In equation 6, k represents the cryptographic key 17 of FIG. 2, H is the hash function, z is the final running hash value upon exiting loop 53, and r is the random string obtained at step 40.

At step 52, key 17 may be used by encryption algorithm 18 to encrypt data 16, producing encrypted data 20 (FIG. 2). Encrypted data 20 may be stored on storage 12 (FIG. 1). The key 17 is not made public, so the contents of encrypted data 10 are secure.

The contents of encrypted data 20 can be recovered by a user at a later time by supplying key derivation function password verification and key recovery process 26 with a valid password (i.e., the same password originally supplied at step 40 of FIG. 5).

Figure 6:
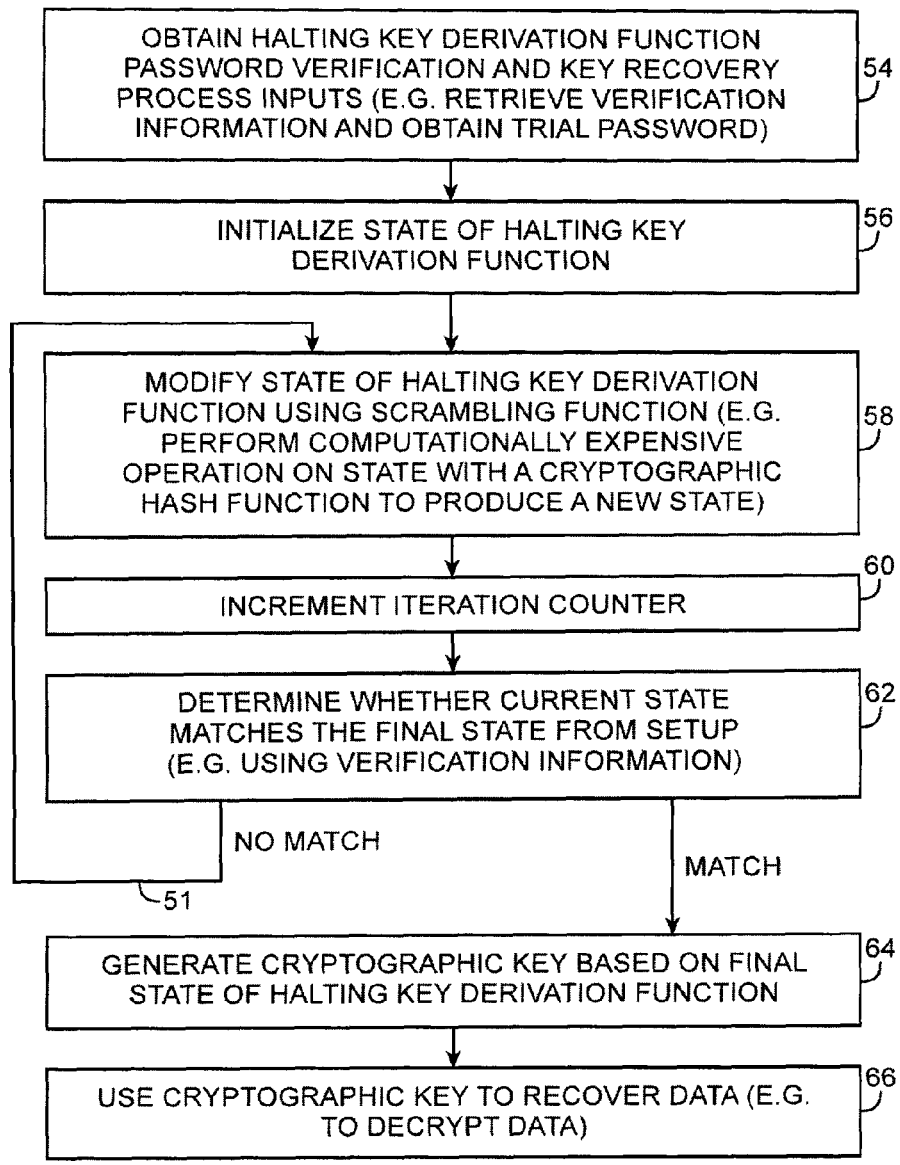
FIG. 6 is a flow chart of illustrative steps involved in using a halting key derivation function password verification and key recovery process in accordance with an embodiment of the present invention.

Illustrative steps involved in using halting key derivation function password verification and key recovery process 26 are shown in FIG. 6. At step 54, halting key derivation function password verification and key recovery process 26 may obtain inputs such as a user-supplied trial password and a complexity parameter to specify when the halting key derivation function password verification and key recovery process should halt. During step 54, halting key derivation function recovery process 26 may retrieve stored verification information 19 from storage 12. The value of q is known and may be built into process 26. During step 54, halting key derivation function recovery process 26 may divide verification information 19 into a first part h that is equal to the $H(y_1,z)$ portion of verification information v from equation 5 and a second part r (i.e., the recovered value of random string r from equation 5).

At step 56, the state of halting key derivation function password verification and key recovery process 26 may be initialized by initializing a running hash value. For example, halting key derivation function recovery process 26 may initialize running hash value z as shown in equation 7.

$$z \leftarrow H(w',r) \quad (7)$$

In equation 7, w' represents a user-supplied trial password, r represents the random string, H represents the hash function, and z represents the running hash value. Halting key derivation function recovery process 26 may initialize the running hash value z in step 56 as part of or prior to a first iteration of a potentially unbounded loop of hash function iterations (loop 51).

In each iteration of loop 51, at step 58, another element $y_i$ in an array of intermediate hash values is created, as shown in equation 2. In equation 2, i now represents the iteration count of loop 51. In each iteration of loop 51, the array of intermediate hash values increases in complexity (i.e., the array grows larger and the computational state of the password verification computation performed by the halting key derivation function password verification and key recovery process has increasing complexity as another element $y_i$ is added). The hash function or other scrambling function used to modify the state of the halting key derivation function is step 58 need not be the same as the hash function or other scrambling function used to initialize the state of the halting key derivation function password verification and key recovery process in step 56.

During step 58, the state of halting key derivation function password verification and key recovery process 26 is modified using hash function H (or other suitable scrambling function). The scrambling function may be based on hash function H. Step 58 may involve computationally expensive operations. For example, halting key derivation function recovery process 26 may perform a computationally expensive loop of q iterations of cryptographic hash function H as shown in equations 3 and 4.

The operations of equations 3 and 4 may be repeated q times in each iteration of loop 51. The value of q used by process 26 is publicly known and matches the value of q used by process 24.

Halting key derivation function recovery process 26 may increment the value of iteration count i at step 60.

At step 62, halting key derivation function password verification and key recovery process 26 may determine whether the current state of the halting key derivation function recovery process 26 matches the final state from the halting key derivation function setup process 24 using verification information 19. In particular, process 26 may compare h (which is equal to the $H(y_1,z)$ portion of verification information v from equation 5) with the value of $H(y_1,z)$ computed at step 58 in the current halting key derivation function password verification and key recovery process 26.

The state of halting key derivation function password verification and key recovery process 26 may continue to be modified by looping back to step 58 as shown by loop 51 until the halting key derivation function recovery process 26 is interrupted by the user, a stopping point defined by the complexity parameter is reached, or a match occurs. Process 26 may return to step 54 when a user clicks on retry option 45 (e.g., FIG. 4A). Process 26 may be aborted when a user clicks on give up option 47 (e.g., FIG. 4A). Process 26 (i.e., loop 53) may be automatically halted by process 26 when a match occurs between the state of the key derivation function recovery process 26 (e.g., $H(y_1,z)$) and the final state of the key derivation function setup process 24 (e.g., h).

When a match occurs at step 62, halting key derivation function password verification and key recovery process 26 may generate a cryptographic key 21 at step 64 according to equation 6.

At step 66, key 21 may be used by decryption algorithm 22 to decrypt data 20, producing unencrypted data 16 (FIG. 2). Unencrypted data 16 may be stored on storage 12 (FIG. 1).

Figure 7:
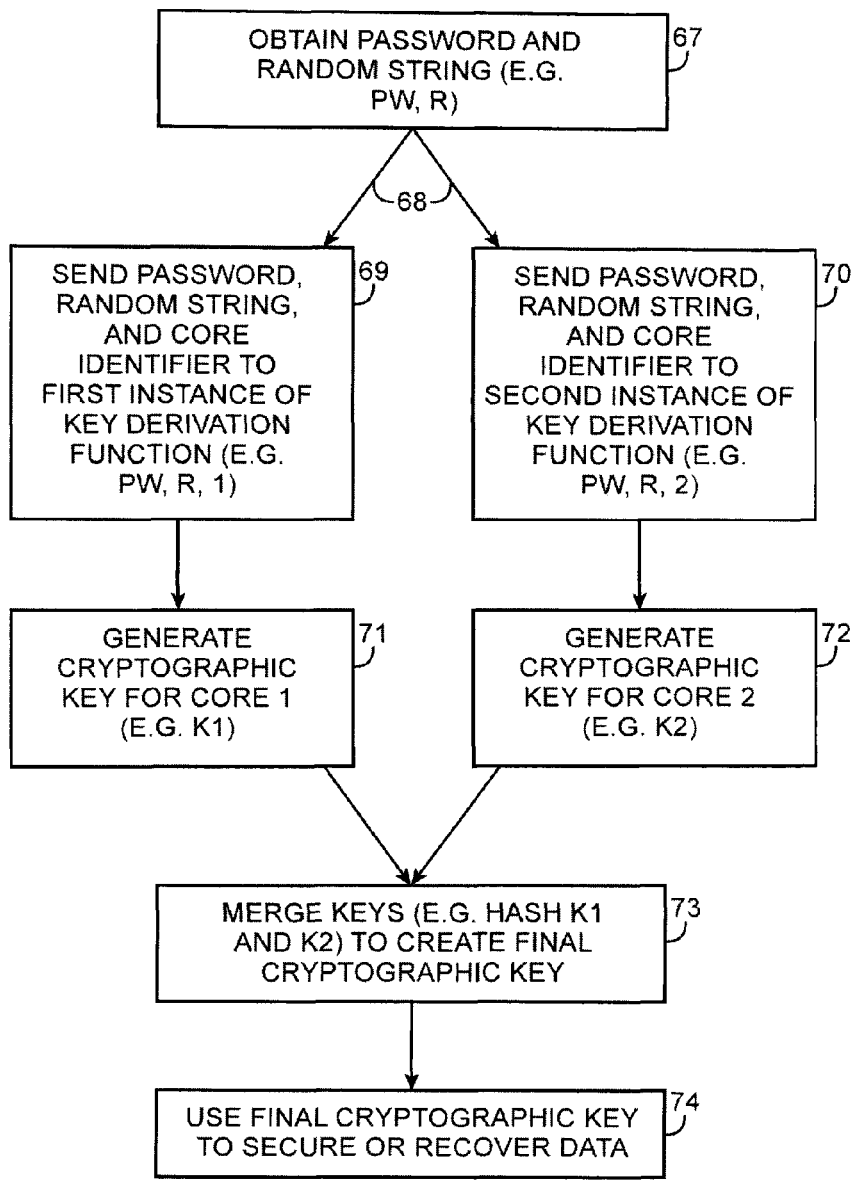
FIG. 7 is a flow chart of illustrative steps involved in using a parallelized key derivation function process in accordance with an embodiment of the present invention.

Illustrative steps involved in using a parallelized key derivation function are shown in FIG. 7. A parallelized key derivation function may be run on multiple processing cores in processing circuitry 15. The parallelized key derivation function may obtain inputs at step 67. A password may be obtained from a user. A complexity parameter may be obtained from the user that specifies a stopping point for a halting key derivation function. The parallelized key derivation function may also generate or otherwise obtain a random string to use as a salt.

As indicated by lines 68, step 69, and step 70, the parallelized key derivation function may provide inputs such as the user-supplied password, the complexity parameter, random string, and a core identifier to separate instances of the parallelized key derivation function. Each separate instance of the parallelized key derivation function may be implemented on a respective one of multiple processing cores in processing circuitry 15. In the example of FIG. 7, there are only two instances of the parallelized key derivation function and two respective cores. The actual number of instances of the parallelized key derivation function and cores that are used may, however, be larger.

Each instance of a parallelized key derivation function may have a respective running hash value. The running hash value may be initialized by applying a hash function to the password, random string, and core identifier.

At step 71 and step 72, each separate instance of the parallelized key derivation function may generate a respective cryptographic key. For example, the first instance of the key derivation function may generate cryptographic key k1 for core 1 at step 71, whereas the second instance of the parallelized key derivation function may generate cryptographic key k2 for core 2 at step 72.

At step 73, a final cryptographic key may be generated by merging the cryptographic keys that were generated in each of the separate processing cores (i.e. the keys k1 and k2 that were generated in steps 71 and 72). For example, the separate cryptographic keys may be merged by a hash function to create a final cryptographic key k.

At step 74, the final cryptographic key k may be used to encrypt or decrypt data. The final cryptographic key is not made public, so the content of data which is encrypted is secure.

Figure 8:
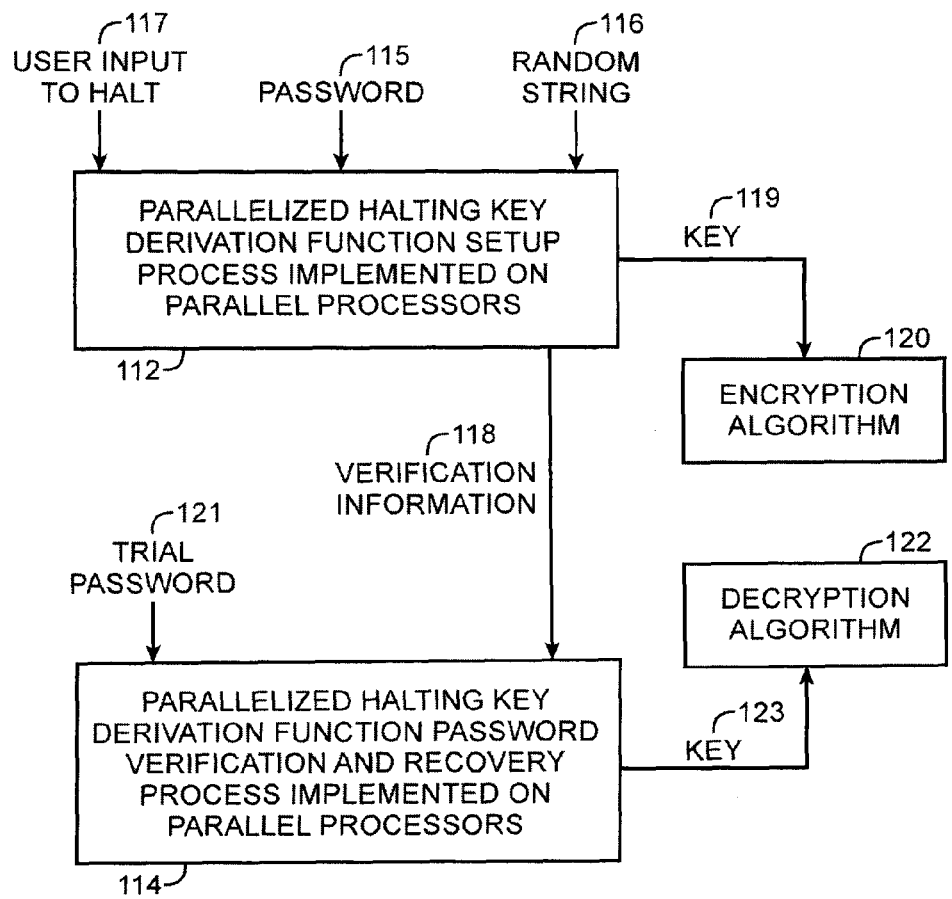
FIG. 8 is a flow diagram of illustrative steps involved in using parallelized halting key derivation function processes in accordance with an embodiment of the present invention.

An illustrative flow diagram showing operations involved in generating and using cryptographic keys in a cryptographic system that has a parallelized halting key derivation function is shown in FIG. 8. Computing equipment 10 of FIG. 1 may be used to run a parallelized halting key derivation function setup process 112, parallelized halting key derivation function password verification and key recovery process 114, encryption algorithm 120, and decryption algorithm 122. Storage 12 of FIG. 1 may be used to store data in a suitable format for use with the encryption algorithm 120 or the decryption algorithm 122.

Before data is encrypted, a key may be generated using parallelized halting key setup process 112. Parallelized halting key setup process 112 may have as inputs a password 115 and a salt 116 (i.e., a random string). Password 115 is typically selected by a user. A user may, for example, use user interface 14 to type in a desired password. Process 112 may generate or otherwise obtain the random string. Process 112 may generate a cryptographic key 119 and verification information 118 based on the user-supplied password and random string. As with process 24 of FIG. 2, key generation process 112 may use an iterative scrambling process based on a hash function or other suitable scrambling function. Iterative operations continue until user input 117 to halt process 112 is received. User input 117 may be in the form of a complexity parameter that specifies when the key generation algorithm should halt. Key 119 is preferably not produced until the scrambling function loop of process 112 is manually halted in this way.

Verification information 118 may contain the random string used during halting key setup process 112 and may contain state information such as hash function values produced when deriving cryptographic key 119. Verification information 118 may be stored (publicly) on storage 12 for later use by parallelized halting key derivation function password verification and key recovery process 114.

After producing cryptographic key 119 from the user-supplied password and the random string, key 119 may be used in an encryption algorithm 120. Encryption algorithm 120 may be, for example, a symmetric key encryption algorithm. To maintain security, key 119 is generally not stored following data encryption.

When it is desired to decrypt data, a user can run process 114. Parallelized halting key derivation function password verification and key recovery process 114 may have as inputs a user-supplied trial password 121, a complexity parameter that specifies when the key generation algorithm should halt, and retrieved verification information 118. As with process 26 of FIG. 2, process 114 may contain a scrambling function loop that runs until the desired key is generated or the user aborts the process. If trial password 121 is incorrect, process 114 will loop until the user aborts process 114. If trial password 121 is correct, process 114 will generate a cryptographic key 123 that matches key 119.

After key 123 has been generated, data can be decrypted using decryption algorithm 122.

Figure 9:
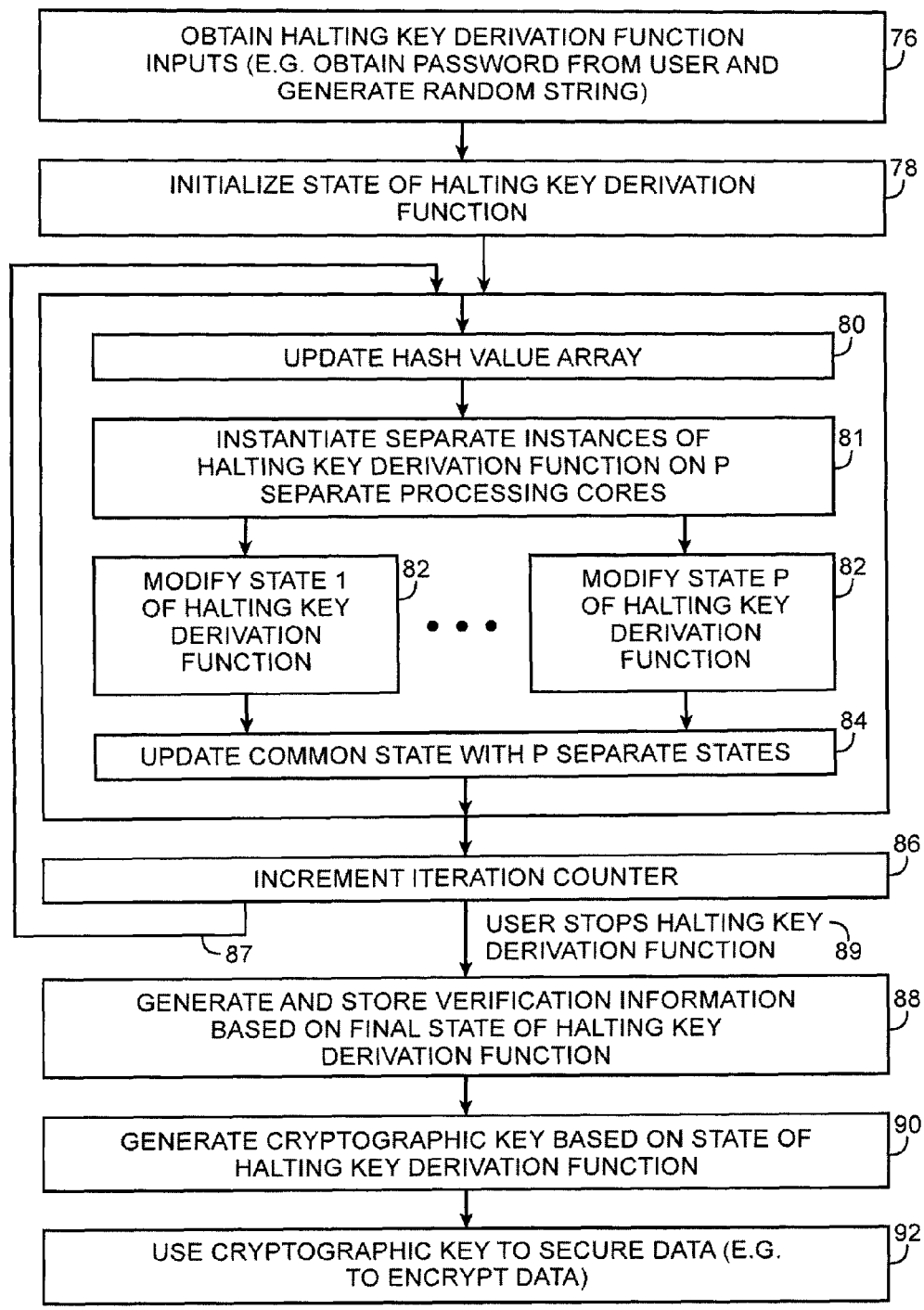
FIG. 9 is a flow chart of illustrative steps involved in using a parallelized halting key derivation function setup process in accordance with an embodiment of the present invention.

Illustrative steps involved in using a parallelized halting key derivation function setup process 112 are shown in FIG. 9. Parallelized halting key derivation function setup process 112 may obtain inputs at step 76. Parallelized halting key derivation function setup process 112 may obtain input from a user such as a password and a complexity parameter that specifies when process 112 should halt. Parallelized halting key derivation function setup process 112 may also generate or otherwise obtain a random string to use as a salt.

At step 78, the state of parallelized halting key derivation function setup process 112 may be initialized by initializing running hash values. For example, parallelized halting key derivation function setup process 112 may initialize running hash values $z_c$ as shown in equation 8.

$$\{z_c \leftarrow H(w,r,c)\}_{c=1,\ldots,P} \quad (8)$$

In equation 8, w represents a user-supplied password, r represents a random string, c represents a core identifier (i.e., c may be 1 for the first core in processor 15, c may be 2 for the second core in processor 15, etc.), H represents a hash function or other suitable scrambling function, $z_c$ represents the running hash value for the cth core, and the brackets along with c=1, ..., P indicate the operation is to be performed in parallel on P separate cores in processor 15.

During step 78, a common running hash value may be initialized. For example, parallelized halting key derivation function setup process 112 may initialize common running hash value z as shown in equation 9.

$$z \leftarrow H(z_1, \ldots, z_p) \quad (9)$$

In equation 9, $z_1, \ldots, z_p$ represents the collection of running hash values from core 1 to core P, H is the hash function or other suitable scrambling function, and z represents the common running hash value. Parallelized halting key derivation function setup process 112 may initialize the common running hash value z in step 78 as part of or prior to a first iteration of a potentially unbounded loop of hash function iterations (loop 87).

At step 80, in each iteration of loop 87, another element $y_i$ in an array of intermediate hash values is created, as shown in equation 2. In equation 2, i now represents the iteration count of loop 87 and $y_i$ now represents the i-th element of an array of intermediate hash values that is assigned a value equal to the current common running hash value z from equation 9. In each iteration of loop 87, the array of intermediate hash values increases in complexity (i.e., the array grows larger and the password generation computation and state of the halting key derivation function setup process have increasing complexity as another element yi is added). The hash function or other scrambling function used to modify the state of the parallelized halting key derivation function in step 82 need not be the same as the as the hash function or other scrambling function used to initiate the state of the parallelized halting key derivation function setup process in step 78. At step 81, the states of parallelized halting key derivation function setup process 112 are sent to P separate processing cores (i.e., a separate instance of process 112 may be run on each of the cores in processor 15 and each such instance may have a respective state).

During step 82, which occurs in P separate processing cores in parallel, the states of the separate instances of the parallelized halting key derivation function setup process 112 are modified using a scrambling function. The scrambling function may be based on the hash function H. Step 82 may involve computationally expensive operations. For example, parallelized halting key derivation function setup process 112 may perform a computationally expensive loop of q iterations of equations 10 and 11 on each processing core.

$$\{j \leftarrow 1 + (z_c \bmod i)\}_{c=1,\ldots,P} \quad (10)$$

In equation 10, an index value j is deterministically and uniformly selected based on the current loop count i (i.e., count i of loop 87) and the value of the running hash value $z_c$. A separate value of j is computed for each core. In equation 11, the current running hash value $z_c$ for each core is updated based on the previous value of $z_c$, intermediate hash value $y_j$ from the intermediate hash value array, and the core identifier c. In equation 10 and equation 11, the brackets along with c=1, ..., P indicate the operation is to be performed in parallel in P separate cores.

The operations of equations 10 and 11 (steps 82) may be repeated q times in each iteration of loop 87. The value of q may be selected to ensure that step 44 is computationally expensive. As an example, the product of p and q may be $2^{20}$ or $10^6$. The values of p and q are publicly known.

At step 84, parallelized halting key derivation function setup process 112 may update the common running hash value by merging the running hash values from the separate instances of the halting key derivation function on each processing core using the hash function H as shown in equation 12.

$$z \leftarrow H(z_1, \ldots, z_p) \quad (12)$$

In equation 12, z represents the common merged running hash value, H is the hash function, and represents the collection of running hash values from core 1 to core P. The separate instances of the key derivation function may collectively define an associated common state. During step 84, a merged hash value is computed using equation 12. The merged hash value represents this common state (i.e., the state of the parallelized halting key derivation function setup process 112).

Parallelized halting key derivation function setup process 112 may increment the value of iteration count i at step 86.

The states of separate instances of the parallelized halting key derivation function may continue to be modified by looping back to step 81 as shown by loop 87 until the parallelized halting key derivation function setup process 112 is halted. Parallelized halting key derivation function setup process 112 (i.e., loop 87) may be halted when a user clicks on finish option 37 (FIG. 3A) or when the stopping point for the loop that is defined by the complexity parameter is reached as shown by line 89.

At step 88, parallelized halting key derivation function setup process 112 may generate and store verification information 118 to be used during a subsequent parallelized halting key derivation function password verification and key recovery process 114. For example, verification information v (i.e. verification information 118) of equation 5 may be generated and stored in storage 12. In equation 5, z now represents the final common running hash value on exiting loop 87, and r now represents the random string from step 76.

At step 90, parallelized halting key derivation function setup process 112 may generate a cryptographic key 119 according to equation 6. In equation 6, z now represents the final common running hash value upon exiting loop 87, and r now represents the random string obtained at step 76.

At step 92, key 119 may be used by encryption algorithm 120 to encrypt data 16, producing encrypted data 20 (FIG. 2). Encrypted data 20 may be stored on storage 12 (FIG. 1). The key 119 is not made public, so the contents of encrypted data 20 are secure.

The contents of encrypted data 20 can be recovered by a user at a later time by supplying a parallelized key derivation function password verification and key recovery process 114 with a valid password (i.e., the same password originally supplied at step 76 of FIG. 9).

Figure 10:
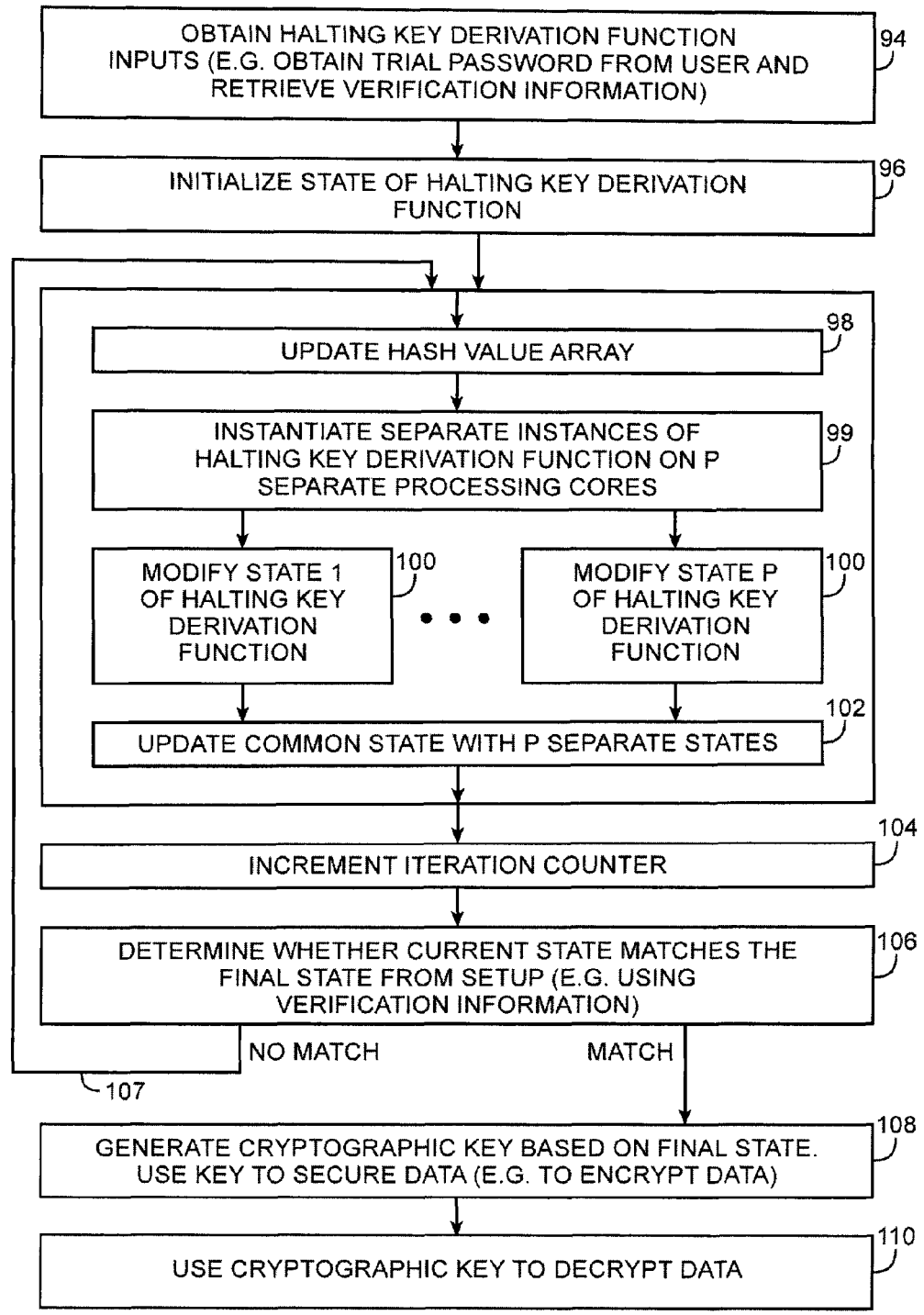
FIG. 10 is a flow chart of illustrative steps involved in a using parallelized halting key derivation function password verification and key recovery process in accordance with an embodiment of the present invention.

Illustrative steps involved in using a parallelized halting key derivation function password verification and key recovery process 114 are shown in FIG. 10. At step 94, parallelized halting key derivation function password verification and key recovery process 114 may obtain inputs such as a user-supplied trial password and a complexity parameter to specify when the parallelized halting key derivation password verification and key recovery process should halt. During step 94, parallelized halting key derivation function password verification and key recovery process 114 may retrieve stored verification information 118 from storage 12. The value of q, which is the same as the value of q used in process 112, is known and may be built into the parallelized halting key derivation function password verification and key recovery process 114. During step 94, parallelized halting key derivation function password verification and key recovery process 114 may divide verification information 118 into a first part h that is equal to the $H(y_1,z)$ portion of verification information v from equation 5 and a second part r (i.e., the recovered value of random string r from equation 5).

At step 96, the state of the parallelized halting key derivation function password verification and key recovery process 114 may be initialized by initializing running hash values. For example, parallelized halting key derivation function password verification and key recovery process 114 may initialize running hash values $z_c$ as shown in equation 8.

At step 96, a common running hash value may be initialized. For example, parallelized halting key derivation function password verification and key recovery process 114 may initialize common running hash value z as shown in equation 9. Parallelized halting key derivation function password verification and key recovery process 114 may initialize the common running hash value z in step 96 as part of a first iteration of a potentially unbounded loop of hash function iterations (loop 107).

At step 98, in each iteration of loop 107, another element $y_i$ in an array of intermediate hash values is created, as shown in equation 2. In equation 2, i now represents the iteration count of loop 107 and $y_i$ now represents the i-th element of an array of intermediate hash values that is assigned a value equal to the current common running hash value z. In each iteration of loop 107, the array of intermediate hash values increases in complexity (i.e., the array grows larger and the computational state of the parallelized password verification computation performed by the parallelized halting key derivation function password verification and key recovery process has increasing complexity as another element yi is added). The hash function or other scrambling function used to modify the state of the parallelized halting key derivation function at step 100 need not be the same as the hash function or other scrambling function used to initialize the state of the halting key derivation function password verification and key recovery process in step 96.

At step 99, separate instances of the parallelized halting key derivation function password verification and key recovery process 114 are instantiated on P separate processing cores.

During step 100 which occurs on P separate processing cores in parallel, the states of the separate instances of the parallelized halting key derivation function password verification and key recovery process 114 are modified using a scrambling function. The scrambling function may be based on the hash function H. Step 100 may involve computationally expensive operations. For example, parallelized halting key derivation function password verification and key recovery process 114 may perform a computationally expensive loop of q iterations of equations 10 and 11.

The operations of equations 10 and 11 may be repeated q times in each iteration of loop 107. The value of q may be selected to ensure that step 100 is computationally expensive. As an example, the product p*q may be $2^{20}$ or $10^6$. The values of p and q are publicly known.

At step 102, parallelized halting key derivation function password verification and key recovery process 114 may update the common running hash value by merging the running hash values from each processing core using a hash function as shown in equation 12. The running hash values from each processing core collectively define a common state for parallelized halting key derivation function password verification and key recovery process 114. The common running hash value that is computed at step 102 is associated with the common state.

Parallelized halting key derivation function password verification and key recovery process 114 may increment the value of iteration count i at step 104.

At step 106, the parallelized halting key derivation function password verification and key recovery process 114 may determine whether the current state of the parallelized key recovery process matches the final state from the parallelized key setup process using verification information 118. In particular, the parallelized halting key derivation function password verification and key recovery process 114 may compare h, which is equal to the $H(y_1,z)$ portion of verification information v from equation 5 (step 88), with $H(y_1,z)$ using the values of $y_1$ and z from the parallelized halting key derivation function password recovery and verification process 114.

If there is no match between h and $H(y_1,z)$, the common state of parallelized halting key derivation function password verification and key recovery process 114 (and the states of each instance of process 114 that are running on separate cores) may continue to be modified by looping back to step 98 as shown by loop 107. If desired, parallelized halting key derivation function password verification and key recovery process 114 (i.e., loop 107) may be aborted when a user clicks on retry option 45 or give up option 47 (FIG. 4A) or when a stopping point defined by the complexity parameter is reached. If a match occurs between the state of the parallelized key recovery process (e.g. h) and the final state of parallelized key setup process (e.g. $H(y_1,z)$ from the retrieved v value of verification information 118), processing may continue at step 108.

At step 108, parallelized halting key derivation function password verification and key recovery process 114 may generate a cryptographic key 123 according to equation 6. In equation 6, z now represents the final common running hash value z upon exiting loop 107, and r now represents the random string obtained at step 94.

At step 110, key 123 may be used by decryption algorithm 122 to decrypt data 20, producing decrypted data 16 (FIG. 2). Decrypted data 16 may be stored on storage 12 (FIG. 1).

What is claimed is:

1. A method for deriving a cryptographic key using a computer-implemented halting key derivation function that has a state, comprising:
   obtaining a password from a user;
   obtaining a random string, wherein the password and random string form inputs to the computer-implemented halting key derivation function;
   in a loop, iteratively modifying the state of the halting key derivation function using a scrambling function;
   receiving user input to halt the loop;
   in response to the user input to halt the loop, halting the loop and generating verification information based on the state of the halting key derivation function when the loop is halted; and
   generating a cryptographic key based on the state of the halting key derivation function when the loop is halted.

2. The method defined in claim 1 further comprising initializing the state of the halting key derivation function using the password obtained from the user and the random string.

3. The method defined in claim 1 further comprising initializing a running hash value by applying a hash function to the password and the random string.

4. The method defined in claim 1 wherein modifying the state of the halting key derivation function using the scrambling function comprises generating an element in an array of values.

5. The method defined in claim 1 wherein modifying the state of the halting key derivation function using the scrambling function comprises generating an element in an array of values using a hash function.

6. The method defined in claim 1 further comprising:
   initializing a running hash value by applying a hash function to the password and the random string; and
   initializing an array of running hash values using the running hash value that was initialized by applying the hash function to the password and the random string, wherein modifying the state of the halting key derivation function using the scrambling function comprises generating an element in the array of running hash values.

7. A method for deriving and using a cryptographic key on a computer having a user interface, a processor, and storage, wherein the cryptographic key is derived using a halting key derivation function setup process having a state, comprising:
   obtaining a password from a user through the user interface;
   obtaining a random string, wherein the password and the random string form inputs to the halting key derivation function;
   in a loop, iteratively modifying the state of the halting key derivation function setup process by using the processor to apply a hash function;
   with the user interface, receiving user input from the user to halt the loop; and
   in response to the user input to halt the loop, halting the loop and generating a cryptographic key based on the state of the halting key derivation function when the loop is halted.

8. The method defined in claim 7 further comprising:
   when the loop is halted by the user, generating verification information with the processor that is based on the state of the halting key derivation function when the loop is halted.

9. The method defined in claim 7 wherein the processor contains a plurality of cores, the method further comprising:
   instantiating a separate instance of the halting key derivation function on each of the plurality of cores, wherein each instance has a respective running hash value that is generated using a hash function.

10. The method defined in claim 7 wherein the processor contains a plurality of cores, the method further comprising:
    instantiating a separate instance of the halting key derivation function on each of the plurality of cores, wherein each instance has a respective running hash value that is generated using a hash function; and
    updating the state of the halting key derivation function setup process by applying a hash function to each of the respective running hash values.

11. The method defined in claim 7 further comprising initializing a running hash value by applying the hash function to the password and the random string.

12. The method defined in claim 7 further comprising:
    initializing a running hash value by applying the hash function to the password and the random string, wherein iteratively modifying the state of the halting key derivation function setup process comprises applying the hash function to at least the running hash value.

13. A computer-implemented method for deriving a cryptographic key using a halting key derivation function that has a state, comprising:
    obtaining a trial password from a user through a computer user interface;
    obtaining verification information that is indicative of a final halting key derivation function state associated with a halting key derivation function setup process and that is indicative of a random string obtained by the halting key derivation function setup process;
    in a loop, iteratively modifying the state of the halting key derivation function using a scrambling function;
    while in the loop, determining whether the current iteratively modified state of the halting key derivation function matches the final halting key derivation function state produced by the halting key derivation function setup process;
    if there is no match between the current iteratively modified state and the final halting key derivation function state, continuing in the loop; and
    if there is a match between the current iteratively modified state and the final halting key derivation function state, generating the cryptographic key.

14. The method defined in claim 13 further comprising initializing a running hash value by scrambling the trial password and the random string.

15. The method defined in claim 13 further comprising:
initializing a running hash value by scrambling the trial password and the random string, wherein iteratively modifying the state of the halting key derivation function comprises updating the running hash value.

16. The method defined in claim 13 further comprising:
initializing a running hash value from the trial password and the random string, wherein iteratively modifying the state of the halting key derivation function comprises updating the running hash value by scrambling the running hash value and an element from an array of intermediate hash values.

17. The method defined in claim 13 further comprising:
while in the loop, using the computer user interface to provide the user with a retry opportunity in which the loop is exited and a new trial password is obtained from the user.

18. The method defined in claim 13 further comprising:
while in the loop, using the computer user interface to provide the user with an opportunity to abort the loop.

19. A method for deriving and using a cryptographic key on a computer having a user interface and a processor having a plurality of cores, comprising:
obtaining a password from a user through the user interface;
obtaining a random string;
instantiating a separate instance of a key derivation function on each of the plurality of cores, wherein the password and the random string form inputs to each instance of the key derivation function and wherein each instance of the key derivation function has a respective running hash value that is generated using a hash function;
in a loop, iteratively updating the running hash value of each instance of the key derivation function;
with the user interface, receiving user input from the user to halt the loop; and
in response to the user input to halt the loop, halting the loop and generating a cryptographic key based on the updated running hash value of each instance of the key derivation function.

20. The method defined in claim 19, wherein the separate instances of the key derivation function collectively define an associated common state, the method further comprising:
updating the common state of the key derivation function by applying the hash function to the running hash values; and
in response to the user input to halt the loop, generating verification information from updated common state of the key derivation function and the random string.

21. A method for deriving and using a cryptographic key on a computer having a user interface and a processor having a plurality of cores, comprising:
obtaining a password from a user through the user interface;
obtaining verification information that is indicative of a final halting key derivation function state associated with a halting key derivation function setup process and that is indicative of a random string obtained by the halting key derivation function setup process;
instantiating a separate instance of a key derivation function on each of the plurality of cores, wherein the password and the random string form inputs to each instance of the key derivation function and wherein each instance of the key derivation function has a respective running hash value that is generated using a hash function;
in a loop, iteratively updating the running hash value of each instance of the key derivation function;
while in the loop, determining whether a common state of the key derivation function matches the final halting key derivation function state produced by the halting key derivation function setup process, wherein the common state of the key derivation function is based on the running hash values;
if there is no match between the common state and the final halting key derivation function state, continuing in the loop; and
if there is a match between the common state and the final halting key derivation function state, generating the cryptographic key.

22. A method for deriving a cryptographic key using a computer-implemented halting key derivation function that has a state, comprising:
obtaining a password from a user;
obtaining a complexity parameter;
obtaining a random string, wherein the password, the complexity parameter, and random string form inputs to the computer-implemented halting key derivation function; and
generating from the password and the random string a cryptographic key and verification information, wherein:
the verification information alone is not indicative of either the complexity parameter or the cryptographic key; and
the cryptographic key is reproducible from the verification information and the password using a computation of complexity indicated by the complexity parameter.

23. The method defined in claim 22, wherein obtaining the complexity parameter comprises obtaining the complexity parameter from the user before generating the cryptographic key.

24. The method defined in claim 22, wherein obtaining the complexity parameter comprises obtaining a time limit for the computer-implemented halting key derivation function.

25. The method defined in claim 22, wherein obtaining the complexity parameter comprises obtaining the complexity parameter from the user through a user interface while generating the cryptographic key.

26. A computer-implemented method for deriving a cryptographic key using a halting key derivation function that has a state, comprising:
obtaining a trial password from a user through a computer user interface;
obtaining verification information that is indicative of a final halting key derivation function state associated with a halting key derivation function setup process and that is indicative of a random string obtained by the halting key derivation function setup process;
in a loop, performing a password verification computation of iteratively increasing complexity, wherein the verification computation takes the trial password and the verification information as inputs, and has a computational state;
while in the loop, using the state of the password verification computation to determine whether the trial password is valid with respect to the verification information produced by the halting key derivation function setup process;
continuing in the loop until the trial password is determined to be valid while performing the password verification computation; and when it is determined that the trial password is valid, generating the cryptographic key based on the computational state of the password verification process.

27. The method defined in claim 26 further comprising:
while in the loop, using the computer user interface to provide the user with a retry opportunity in which the loop is exited and a new trial password is obtained from the user.

28. The method defined in claim 26 further comprising:
while in the loop, using the computer user interface to provide the user with an opportunity to abort the loop.

29. The method defined in claim 26 further comprising:
stopping the loop when a limit specified by a complexity parameter is reached.

\* \* \* \* \*